United States Patent
Hoskins et al.

[11] Patent Number: 6,039,305
[45] Date of Patent: Mar. 21, 2000

[54] BITE VALVE FOR HYDRATION BLADDER

[75] Inventors: Matthew W. Hoskins; Michel A. Boileau, both of Bend, Oreg.

[73] Assignee: K-2 Corporation, Vashon, Wash.

[21] Appl. No.: 09/010,388

[22] Filed: Jan. 21, 1998

[51] Int. Cl.[7] .................................................. F16K 31/14
[52] U.S. Cl. ...................................... 251/342; 224/148.2
[58] Field of Search ..................................... 251/342, 343, 251/344; 224/148.2

[56] References Cited

U.S. PATENT DOCUMENTS

| | | | |
|---|---|---|---|
| 1,418,592 | 6/1922 | McGee | 251/342 |
| 2,706,101 | 4/1955 | Cantor | 251/342 X |
| 2,946,555 | 7/1960 | Cantor | 251/342 |
| 3,231,149 | 1/1966 | Yuza . | |
| 3,365,138 | 1/1968 | Green . | |
| 3,799,193 | 3/1974 | Greenwood et al. . | |
| 3,991,768 | 11/1976 | Portnoy . | |
| 4,106,675 | 8/1978 | Taylor | 222/556 |
| 4,134,424 | 1/1979 | Zeyra et al. . | |
| 4,357,959 | 11/1982 | Shetler . | |
| 4,759,752 | 7/1988 | Stöber . | |
| 5,071,411 | 12/1991 | Hillstead . | |
| 5,092,855 | 3/1992 | Pardes . | |
| 5,305,783 | 4/1994 | Debush . | |

*Primary Examiner*—John Fox
*Attorney, Agent, or Firm*—Christensen O'Connor Johnson & Kindness PLLC

[57] ABSTRACT

A bite valve (12) for a hydration bladder (14) includes a deformable sleeve (34) and an elongate valve body (36) that is received within the deformable sleeve. The valve body includes an inlet (28) that is coupleable by a tube (26) to receive fluid (16) from the hydration bladder. The inlet has a first sealing surface (56) in sealing engagement with an inner surface of the deformable sleeve. The inlet has a flow channel (48) therethrough defined along a first axis (50). The valve body also includes an outlet (30) that is in fluid communication with the flow channel. The outlet is defined by a bulkhead flange (72) with a second sealing surface (78) that is normally in sealing engagement with the deformable sleeve. The outlet is longitudinally spaced apart from the inlet by a cylindrical stem (32). The cylindrical stem has an axis (71) that is substantially aligned with the axis of the flow channel. Deformation of the deformable sleeve toward the stem takes the deformable sleeve out of sealing engagement with the bulkhead flange, regardless of radial orientation of the deformation, to permit fluid flow through the outlet.

22 Claims, 2 Drawing Sheets

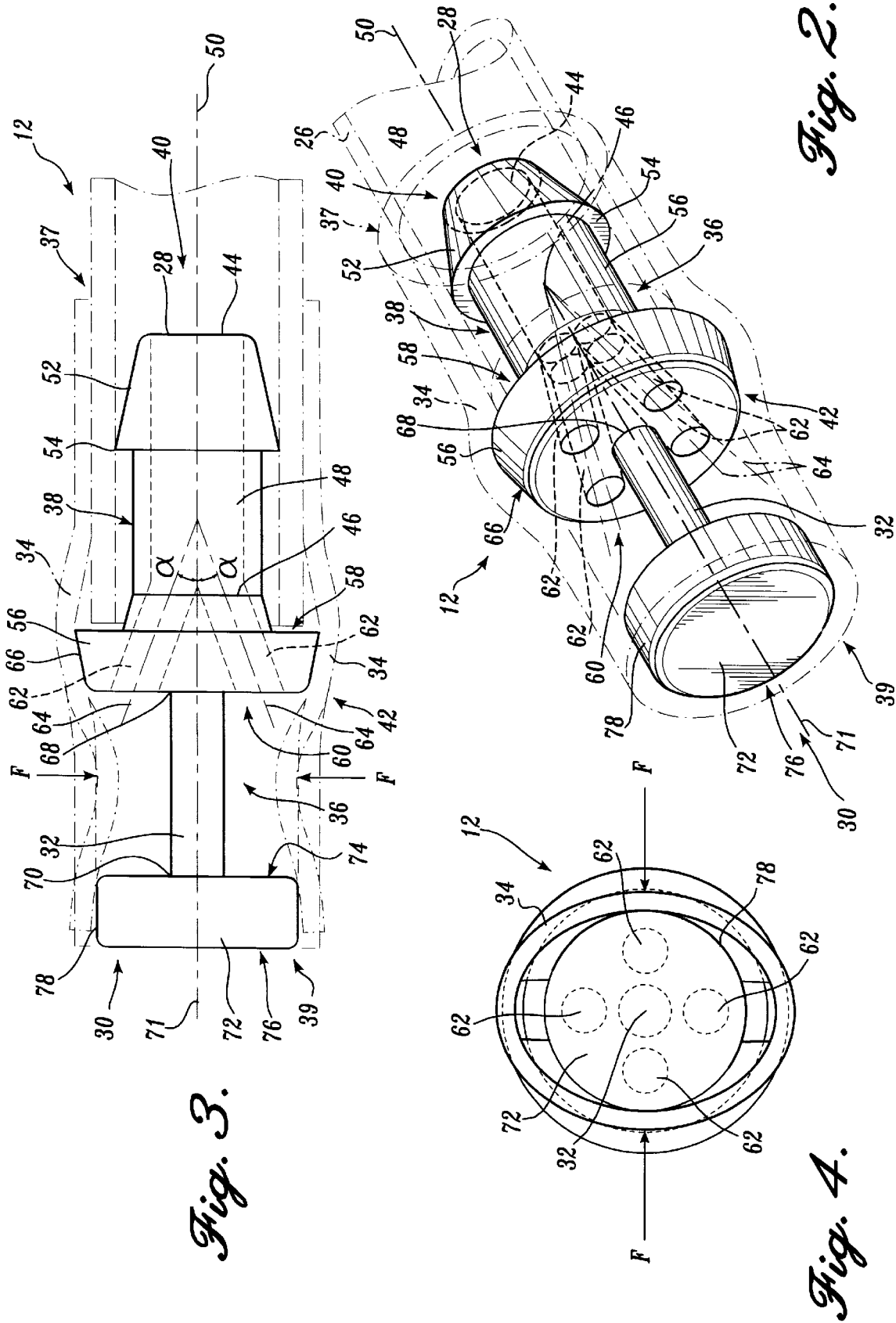

BITE VALVE FOR HYDRATION BLADDER

FIELD OF THE INVENTION

The present invention relates to valves and, more particularly, to bite valves for hydration bladders.

BACKGROUND OF THE INVENTION

Sufficient hydration is important for replacing bodily fluids during extended periods of aerobic activity, such as cycling. Currently, several methods are known for getting fluids to a person engaged in aerobic activity and in need of fluid replenishment.

For example, a person engaged in aerobic activity could stop the aerobic activity and take a drink, such as at aid stations. However, this disrupts the aerobic activity and is not well suited for events like competitive cycling races.

It is desirable to make replenishment fluid available without the need for slowing or stopping aerobic activity. Water bottles carried by persons engaged in aerobic activity represent an attempt to overcome the problems associated with aid stations. However, water bottles are awkwardly shaped. Further, the use of one or both hands is required to drink from a water bottle. Therefore, the use of water bottles can present safety hazards to cyclists.

In an attempt to overcome the deficiencies of water bottles, hydration systems have been developed that include a flexible reservoir for holding fluid, a flexible tube for conveying the fluid from the reservoir to the person engaged in aerobic activity, and a valve, such as a mouth operated bite valve, attached to the end of the tube. When it is desired to replenish fluids, the person engaged in aerobic activity places the outlet of the valve in his or her mouth and bites down on a flexible valve covering. The valve covering deforms and is taken out of sealing engagement with an internal valve member, and fluid from the reservoir flows into the person's mouth. However, in order to withstand stresses induced when bitten, known bite valves have elongate strength members that span the diameter of the valve. Thus, in order to replenish fluids using known bite valves, a person engaged in aerobic activity must first align the bite valve to a predetermined orientation. Only then can the valve covering be bitten, thereby breaking the valve seal and permitting fluid flow. Orienting the valve entails the use of at least one hand, and possibly both hands. Thus, the use of this type of known bite valve also presents safety hazards to cyclists.

Other conventional bite valves, utilize a slotted plastic end cap that is inserted into the end of the tube extending from the bladder. The end cap is bitten to cause the slots to open, permitting fluid flow. Through extended use, the plastic tends to weaken, resulting in undesired leakage through the slots.

Therefore, there is an unmet need in the art for a hydration bladder valve that can be operated without being positioned to a predetermined orientation to permit operation.

SUMMARY OF THE INVENTION

The present invention provides a bite valve for use in a hydration system. The bite valve includes a deformable sleeve that is normally in sealing engagement with an outlet port defined in a valve member. According to the present invention, when the deformable sleeve is subject to deformation, regardless of orientation of the deformation, the outlet seal is broken and fluid flows past the outlet seal. Therefore, a person engaged in aerobic activity can replenish bodily fluids using the present invention without the need for positioning the bite valve to a predetermined orientation. Thus, the present invention avoids safety hazards potentially presented by known bite valves.

According to another aspect of the present invention, a bite valve for a hydration bladder includes a deformable sleeve. The deformable sleeve is normally cylindrical and has an inner surface. The bite valve also includes an elongate valve body that is received within the deformable sleeve. The valve body includes an inlet that is coupleable to receive fluid from a fluid source. The inlet has a first sealing surface in sealing engagement with the inner surface of the deformable sleeve. The inlet has a flow channel defined therethrough, and the flow channel has a first axis. The valve body also includes an outlet that is in fluid communication with the flow channel. The outlet includes a bulkhead flange with a second sealing surface that is normally in sealing engagement with the deformable sleeve. The outlet is longitudinally spaced apart from the inlet by a cylindrical member that is interposed between the bulkhead flange and the inlet. The cylindrical member has an axis that is substantially aligned with the axis of the flow channel. Deformation of the deformable sleeve toward the cylindrical member takes the second sealing surface out of sealing engagement with the deformable sleeve regardless of radial orientation of the deformation.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 2 is a perspective view of a bite valve according to the present invention;

FIG. 3 is a plan view of the bite valve of FIG. 2; and

FIG. 4 is an end view of the valve of FIG. 2 shown in use.

DETAILED DESCRIPTION OF THE PREFERRED EMBODIMENT

Figure 1:
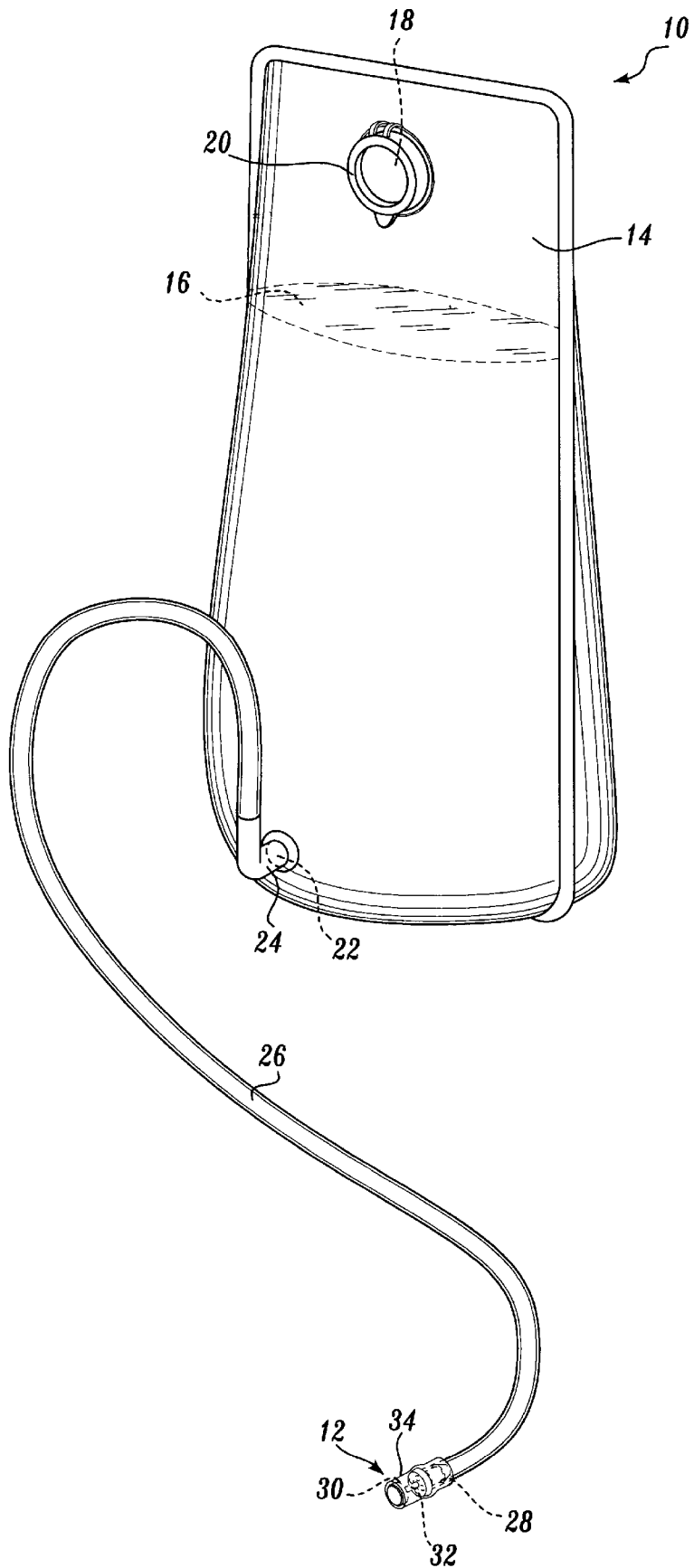
FIG. 1 is a perspective view of a hydration system including a bite valve according to the present invention.

FIG. 1 shows a hydration system 10 that includes a bite valve 12 according to the present invention. A reservoir 14, such as a bag, is made of a flexible material, such as a thermoplastic or thermosetting polymer. Suitable materials include polyethylene and polyvinyl chloride. In use, the reservoir 14 contains a fluid 16, such as water or a sports drink. The reservoir 14 includes a fill port 18. A cap 20 is hingedly attached to the fill port 18 for placing the cap 20 in sealing engagement with the fill port 18. A drain port 22 in the reservoir 14 is sealed to a drain fitting 24. A tube 26 is attached to the drain fitting 24. The tube 26 is suitably made from a flexible material, such as polyvinyl chloride or silicone rubber. The tube 26 is attached to an inlet 28 of an elongate valve body 36 (FIG. 2) of the bite valve 12. The valve body 36 of the bite valve 12 also includes an outlet 30 that is longitudinally spaced apart from the inlet 28 by a solid cylindrical stem 32 that is interposed between the inlet 28 and the outlet 30. The bite valve 12 includes a deformable sleeve 34 in sealing engagement with the inlet 28 and normally in sealing engagement with the outlet 30. As will be discussed in detail below, when the deformable sleeve 34 is selectively deformed toward the cylindrical stem 32 by a user's teeth, the deformable sleeve is taken out of sealing engagement with the outlet 30 so the fluid 16 can flow out the outlet 30.

Referring now to FIG. 2, the bite valve 12 includes the elongate valve body 36 that is received within the deformable sleeve 34, shown in phantom. The valve body 36 includes the inlet 28, the outlet 30 and the cylindrical stem 32. The elongate valve body 36 suitably has a one piece, unitary construction and is made of a lightweight material having high strength characteristics, such as a polyamide or acrylo-butadiene-styrene plastic. The deformable sleeve 34 has a first end 37 and a second end 39, and is suitably made from a resilient, flexible elastomer, such as silicone rubber or polyvinyl chloride.

The inlet 28 is an elongate member 38 having a first end 40 and a second end 42. An inlet port 44 is defined in the first end 40 of the elongate member 38 by a channel 48 extending from the first end 40, where it defines the inlet port 44, toward the second end 42 along a central axis 50, terminating at a terminus 46 between the first end 40 and the second end 42. The first end 40 has a circular shape with an outer diameter that is less than an inner diameter of the tube 26. A frusticonical sealing surface 52 extends from the first end 40 toward the terminus 46, and terminates at a terminus 54. At the terminus 54, the cone formed by the sealing surface 52 has an outer diameter that is preferably slightly greater than the inside diameter of the tube 26 in order to provide a seal with the tube 26. The inlet 28 defines a reduced diameter cylindrical section 56 between the sealing surface 52 and the terminus 46.

The second end 42 of the inlet 28 includes a disk-shaped flange 56 having a first face 58 and a second face 60. A plurality of branch channels 62 extend through the disk-shaped flange 56 from the terminus 46 of the channel 48 within the cylindrical section 56 to the second face 60 of the flange 56. The branch channels 62 are thus in fluid communication with the channel 48 and the inlet port 44. Each of the branch channels 62 has a central axis 64 that forms an angle α with the central axis 50 of the channel 48. The angle α is any suitable angle that diverts flow of the fluid 16 radially outward past the cylindrical stem 32, such that fluid flow is not impeded by the cylindrical stem 32. For example, the angle α is suitably between 15 degrees and 25 degrees, and is preferably 20 degrees in a currently preferred embodiment. However, it will be appreciated that the angle α may have any value that results in diverting the flow of the fluid 16 radially past the cylindrical stem 32. While four of the branch channels 62 are shown by way of nonlimiting example, it will be appreciated that any acceptable number of the branch channels 62 may be included. It will be further appreciated that as few as one of the branch channels 62 may be used.

In such a case, structural integrity of the elongate valve body 36 would be enhanced at the expense of increased pressure drop in the flow of the fluid 16 through the branch channel 62. It will also be appreciated that increasing the number of the branch channels 62 would reduce the pressure drop of fluid 16 flowing through the branch channels 62 at the expense of the structural integrity of the elongate valve body 36, and that these two factors may be optimized, as desired.

The disk-shaped flange 56 has an outside diameter that tapers from the first face 58 to the second face 60. The diameter of the first face 58 is preferably greater than the inside diameter of the deformable sleeve 34. The flange 56 thus defines a tapered sealing surface 66 that expands and seals against the deformable sleeve 34.

The cylindrical stem 32 projects integrally and centrally from the second face 60 of the disk-shaped flange 56 between outlet ports defined by each of the branch channels 62 in the second face 60. The cylindrical stem 32 has a diameter that is minimized for permitting maximum deformation of the deformable sleeve 34, as shall be described. Also, minimizing the diameter of the stem 32 permits minimizing the angle α of the branch channels 62 and the resultant diversion of flow of the fluid 16. Thus, a minimized diameter of the stem 32 results in a maximized flow of the fluid 16. However, the diameter of the cylindrical stem 32 must be large enough such that the cylindrical stem 32 retains sufficient strength characteristics to resist breakage during use. The cylindrical stem 32 has a first end 68, that extends from the disk-shaped flange 56 between outlet ports of the channels 62, and a second end 70. The cylindrical stem 32 has an axis 71 that is aligned with the axis 50 of the flow channel 48.

The outlet 30 is defined by a bulkhead flange 72. The bulkhead flange 72 has a first face 74 and a second face 76. The first face 74 of the bullhead flange is centrally formed on the second end 70 of the cylindrical stem 32. The bulkhead flange 72 has a diameter that is at least equal to and preferably slightly greater than the inside diameter of the deformable sleeve 34. The perimeter of the bulkhead flange 72 thus defines a sealing surface 78 that slightly expands and seals against the interior of the deformable sleeve 34. The diameter of the bulkhead flange 72, while slightly greater than the relaxed, normal inside diameter of the deformable sleeve 34, is less than the diameter of the flange 56. While the flange 56 greatly expands and remains in constant sealing engagement with the deformable sleeve 34, the bulkhead flange 72 is sized to permit selective disengagement of the seal with the deformable sleeve 34.

The bite valve 12 is assembled as follows. The elongate valve body 36 is inserted into the deformable sleeve 34 until the second face 76 of the bulkhead flange 72 is flush with the second end 39 of the deformable sleeve 34. The second end 39 of the deformable sleeve 34 may alternately suitably extend slightly past the second face 76 of the bulkhead flange 72. The sealing surfaces 66 and 78 of the flanges 56 and 72, respectively, are in sealing engagement with the deformable sleeve 34. An annular chamber is thus defined between the bulkheads 56 and 72, and is nominally sealed by the deformable sleeve 34. The first end 40 of the elongate valve body 36 is slid into the tube 26, and the sealing surface 52 is in sealing engagement with the tube 26. The reservoir 14 is filled with the fluid 16, such as water or a sports drink, through the fill port 18. Fluid freely flows from the reservoir 14 through the tube 26 and the inlet 28 of the bite valve 12. However, normal sealing engagement of the deformable sleeve 34 with the bulkhead flange 72 prevents the fluid from exiting out the outlet 30.

During use, when hydration is desired, the person engaged in aerobic activity applies a force F to the deformable sleeve 34, such as by gently biting the bite valve 12 between the user's incisors. The force F is applied between the second face 60 of the disk-shaped flange 56 and the first face 74 of the bulkhead flange 72. The force F is suitably applied from any radial orientation about the cylindrical stem 32. As shown in FIGS. 3 and 4, the force F deforms the deformable sleeve 34 toward the cylindrical stem 32, thereby distorting the second end 39 of the deformable sleeve into an ovoid contour, taking the deformable sleeve 34 out of sealing engagement with the sealing surface 78 of the bulkhead flange 72. Outlet ports are thus created between the deformed sleeve 34 and the bulkhead flange 72, and fluid can flow freely from the annular chamber surrounding the stem 32.

Fluid flow may be driven by any of several mechanisms. For example, if the reservoir 14 is at a higher elevation than the bite valve 12, the pressure head of the fluid 16 in the reservoir 14 causes the fluid 16 to flow out the drain port 22, through the tube 26, through the inlet port 28, through the channel 48 and the plurality of branch channels 62, and past the bulkhead flange 70 (when the valve is opened). If desired, a higher flow rate of the flow 16 may be obtained by pressurizing fluid within the reservoir 14. For example, the deformable sleeve 34 may be bitten, thereby applying the force F, while air is blown through the bite valve 12 and into the reservoir 14, thereby pressurizing the reservoir 14. With the reservoir 14 thus pressurized, flow rate of the fluid 16 upon opening of the valve 12 is increased, until pressure within the reservoir 14 equalizes with ambient pressure. Pressurization of fluid within the reservoir may alternately be created by compressing the reservoir 14, such as by applying an expanded elastic sleeve (not shown) over the reservoir 14. It should be apparent that flow of the fluid 16 may be driven by either a gravity pressure head, pressurization of the fluid 16, or both.

It will be appreciated that the person engaged in aerobic activity can bite the deformable sleeve 34, thereby applying the force F, anywhere between the second face 60 of the disk-shaped flange 56 and the first face 74 of the bulkhead flange 72. Further, the force F may be suitably applied regardless of radial orientation about the cylindrical stem 32. Thus, the deformable sleeve 34 may be taken out of sealing engagement with the sealing surface 72 without orienting the bite valve 12 to a predetermined orientation.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A bite valve for controlling flow of fluid from a fluid source, the bite valve comprising:
   a deformable sleeve having an inner surface; and
   an elongate valve body received within the deformable sleeve, the valve body including:
      an inlet coupleable to receive fluid from the fluid source and defining a flow channel along a first axis;
      an outlet in fluid communication with the flow channel, the outlet having a sealing surface normally in sealing engagement with the deformable sleeve; and
      a stem interposed between the outlet and the inlet, the stem having a transverse width that is reduced relative to the sealing surface, such that deformation of the deformable sleeve toward the stem takes the sealing surface out of sealing engagement with the deformable sleeve.

2. The bite valve of claim 1, wherein the stem defines a second axis that is aligned with the first axis, so that deformation of the deformable sleeve toward the stem opens the valve regardless of radial orientation of deformation.

3. The bite valve of claim 2, wherein the inlet is attached to the stem at a first end of the inlet, the inlet further defining a branch channel in fluid communication with the flow channel, the branch channel having a third axis that forms an angle with the first axis, such that an outlet of the flow channel is radially spaced from the stem.

4. The bite valve of claim 3, further comprising a plurality of branch channels.

5. The bite valve of claim 1, wherein the inlet is attached to the stem at a first end of the inlet, the inlet further defining a branch channel in fluid communication with the flow channel, the branch channel having a second axis that forms an angle with the first axis, such that an outlet of the flow channel is radially spaced from the stem.

6. The bite valve of claim 1, wherein the inlet includes a disk-shaped flange having a diameter sized larger than an inner diameter of the deformable sleeve.

7. The bite valve of claim 6, wherein the diameter of the disk-shaped flange is predetermined such that the disk-shaped flange is received within and expands the deformable sleeve.

8. The bite valve of claim 1, wherein the outlet includes a bulkhead flange that defines the sealing surface, the bulkhead flange having a diameter equal to or greater than an inner diameter of the deformable sleeve.

9. The bite valve of claim 8, wherein the diameter of the bulkhead flange is greater than the inner diameter of the deformable sleeve.

10. A hydration system comprising:
    a reservoir for receiving fluid;
    a tube coupled in fluid communication with the reservoir for receiving the fluid, the tube having an inner surface; and
    a bite valve for controlling flow of the fluid from the reservoir, the bite valve including:
       a deformable sleeve having an inner surface; and
       an elongate valve body received within the deformable sleeve, the valve body including:
          an inlet coupled in fluid communication with the tube for receiving the fluid and defining a flow channel along a first axis;
          an outlet in fluid communication with the flow channel, the outlet having a sealing surface normally in sealing engagement with the deformable sleeve; and
          a stem interposed between the outlet and the inlet, the stem having a transverse width that is reduced relative to the sealing surface, such that deformation of the deformable sleeve toward the stem takes the sealing surface out of sealing engagement with the deformable sleeve.

11. The hydration system of claim 10, wherein the stem defines a second axis that is aligned with the first axis, so that deformation of the deformable sleeve toward the stem opens the valve regardless of radial orientation of deformation.

12. The hydration system of claim 11, wherein the inlet is attached to the stem at a first end of the inlet, the inlet further defining a branch channel in fluid communication with the flow channel, the branch channel having a third axis that forms an angle with the first axis, such that an outlet of the flow channel is radially spaced from the stem.

13. The hydration system of claim 12, further comprising a plurality of the branch channels.

14. The hydration system of claim 10, wherein the inlet is attached to the stem at a first end of the inlet, the inlet further defining a branch channel in fluid communication with the flow channel, the branch channel having a second axis that forms an angle with the first axis, such that an outlet of the flow channel is radially spaced from the stem.

15. The hydration system of claim 12, wherein the inlet includes a disk-shaped flange at a second end of the inlet port, the disk-shaped flange being in sealing engagement with the inner surface of the tube, the disk-shaped flange having a diameter sized larger than an inner diameter of the tube.

16. The hydration system of claim 15, wherein the diameter of the disk-shaped flange is predetermined such that the disk-shaped flange is received within and expands the tube.

17. The hydration system of claim 15, wherein the tube is received within the deformable sleeve, the deformable sleeve biasing the tube in sealing engagement with the disk-shaped flange.

18. A bite valve for controlling flow of fluid from a fluid source, the bite valve comprising:

a deformable sleeve having an inner surface; and an elongate valve body received within the deformable sleeve, the valve body including:

an inlet coupleable to receive fluid from the fluid source, the inlet including a disk-shaped flange that defines a first sealing surface in sealing engagement with the inner surface of the deformable sleeve, the disk-shaped flange having a diameter sized larger than an inner diameter of the deformable sleeve, the inlet having a flow channel defined along a first axis;

an outlet in fluid communication with the flow channel, the outlet including a bulkhead flange that defines a second sealing surface normally in sealing engagement with the deformable sleeve, the bulkhead flange having a diameter equal to or greater than an inner diameter of the deformable sleeve; and a stem interposed between the outlet and the inlet, the stem having a transverse width that is reduced relative to the first and second sealing surfaces, such that deformation of the deformable sleeve toward the stem takes the second sealing surface out of sealing engagement with the deformable sleeve.

19. The bite valve of claim 18, wherein the stem defines a second axis that is aligned with the first axis, so that deformation of the deformable sleeve toward the stem opens the valve regardless of radial orientation of deformation.

20. The bite valve of claim 19, wherein the inlet is attached to the stem at a first end of the inlet, the inlet further defining a branch channel in fluid communication with the flow channel, the branch channel having a third axis that forms an angle with the first axis, such that an outlet of the flow channel is radially spaced from the stem.

21. The bite valve of claim 20, further comprising a plurality of the branch channels.

22. A bite valve for controlling flow of fluid from a fluid source, the bite valve comprising:

a deformable sleeve having an inner surface;

an elongate valve body received within the deformable sleeve, the valve body including:

an inlet portion coupleable in fluid flow communication with the fluid source;

an outlet portion including a sealing surface normally in sealing engagement with a distal end of the deformable sleeve;

a recessed portion defined between the inlet portion and the outlet portion, the valve body further defining an inlet flow channel extending through the inlet portion and terminating at a chamber bordered by the recessed portion and the inner surface of the deformable sleeve, wherein selective depression of the deformable sleeve between the inlet and outlet portions into the recessed portion opens an outlet flow channel from the chamber past the sealing surface to permit fluid flow through the valve.

* * * * *